United States Patent
Kawamura et al.

(10) Patent No.: US 10,228,845 B2
(45) Date of Patent: *Mar. 12, 2019

(54) PREVIEWING PORTIONS OF ELECTRONIC DOCUMENTS

(71) Applicant: International Business Machines Corporation, Armonk, NY (US)

(72) Inventors: Tateo Kawamura, Yamato (JP); Shoichiro Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 139 days.

This patent is subject to a terminal disclaimer.

(21) Appl. No.: 15/355,313

(22) Filed: Nov. 18, 2016

(65) Prior Publication Data

US 2017/0068442 A1 Mar. 9, 2017

Related U.S. Application Data

(63) Continuation of application No. 14/845,477, filed on Sep. 4, 2015.

(51) Int. Cl.
*G06F 3/0488* (2013.01)
*G06F 3/0485* (2013.01)
(Continued)

(52) U.S. Cl.
CPC ........ *G06F 3/04883* (2013.01); *G06F 3/0485* (2013.01); *G06F 3/04886* (2013.01);
(Continued)

(58) Field of Classification Search
CPC .............. G06F 3/04883; G06F 3/0485; G06F 3/04886; G06F 17/2247; G06F 17/27; G06F 17/2785
See application file for complete search history.

(56) References Cited

U.S. PATENT DOCUMENTS 7,469,381 B2 12/2008 Ording
8,812,995 B1 8/2014 Murphy
(Continued)

FOREIGN PATENT DOCUMENTS

JP 2003271664 A 9/2003
JP 2006313485 A 11/2006
(Continued)

OTHER PUBLICATIONS

Anonymous, "Method and System for Preview of Pages in Table of Content", IP.com Prior Art Database Technical Disclosure. IP.com No. 000239765. Published Dec. 1, 2014. 2 pages.
(Continued)

*Primary Examiner* — Mandrita Brahmachari
(74) *Attorney, Agent, or Firm* — Jay Wahlquist

(57) ABSTRACT

A computer device displays some amount of an electronic document which includes an object. The object correlates with both a first and second portion of the electronic document. The first and second portions are different. The device detects a first input gesture which is located within a predetermined distance of the object. The first portion is determined to correlate with both the object and the first input gesture. In response to determining this correlation, the first portion is displayed. After displaying the first portion, the device detects a second input gesture. The second input gesture is within the predetermined distance of the same object. The second input gesture includes a different motion than the first input gesture. The device determines that the second portion correlates with both the object and the second gesture. In response to this determination, the second portion is displayed.

8 Claims, 4 Drawing Sheets

(51) Int. Cl.
*G06F 17/22* (2006.01)
*G06F 17/27* (2006.01)

(52) U.S. Cl.
CPC ......... *G06F 17/2247* (2013.01); *G06F 17/27* (2013.01); *G06F 17/2785* (2013.01); *G06F 2203/04803* (2013.01); *G06F 2203/04804* (2013.01)

(56) References Cited

U.S. PATENT DOCUMENTS

| | | | |
|---|---|---|---|
| 2009/0073501 A1* | 3/2009 | Gutarin | G06F 17/30722 358/403 |
| 2012/0216143 A1 | 8/2012 | Shiplacoff et al. | |
| 2012/0233539 A1 | 9/2012 | Reed | |
| 2013/0055140 A1* | 2/2013 | Mosquera | G06F 3/0483 715/776 |
| 2013/0085843 A1 | 4/2013 | Dyor et al. | |
| 2014/0173530 A1* | 6/2014 | Mesguich Havilio | G06F 3/04883 715/863 |
| 2014/0180826 A1 | 6/2014 | Boal | |
| 2014/0195961 A1 | 7/2014 | Shoemaker et al. | |
| 2014/0236576 A1 | 8/2014 | Hollingsworth | |
| 2015/0033120 A1 | 1/2015 | Cooke et al. | |
| 2015/0161080 A1* | 6/2015 | Sharp | G06F 17/212 715/203 |
| 2015/0227263 A1 | 8/2015 | Wu et al. | |
| 2017/0068412 A1 | 3/2017 | Kawamura et al. | |

FOREIGN PATENT DOCUMENTS

| | | |
|---|---|---|
| JP | 201283889 A | 4/2012 |
| JP | 2013200800 A | 10/2013 |

OTHER PUBLICATIONS

Kawamura, et al., "Previewing Portions of Electronic Documents", U.S. Appl. No. 14/845,477, filed Sep. 4, 2015.

List of IBM Patents or Patent Applications Treated as Related, Nov. 16, 2016. 2 pages.

* cited by examiner

PREVIEWING PORTIONS OF ELECTRONIC DOCUMENTS

BACKGROUND

Users of computing devices may view electronic documents on said computing devices. Computing devices may include touchscreen devices. Users may manipulate which section of the electronic document is shown by providing input to the computing device. Input may include using a device such as a mouse or keyboard, or it may include a tactile motion upon a touchscreen.

SUMMARY

Embodiments of the disclosure provide a method, system, and computer program product for previewing portions of electronic documents. A computer device may display some amount of an electronic document which includes an object, such as a word or phrase. The object may correlate with both a first portion of the electronic document and a second portion of the electronic document. The first and second portions may be different. The device may detect a first input gesture which is located within a predetermined distance of the object. The first portion may be determined to correlate with both the object and the first input gesture. In response to determining this correlation, the first portion may be displayed.

After displaying the first portion, the device may detect a second input gesture. The second input gesture may be located within a predetermined distance of the same object. The second input gesture may include a different motion than the first input gesture. The device may determine that the second portion correlates with both the object and the second gesture. In response to this determination, the second portion may be displayed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
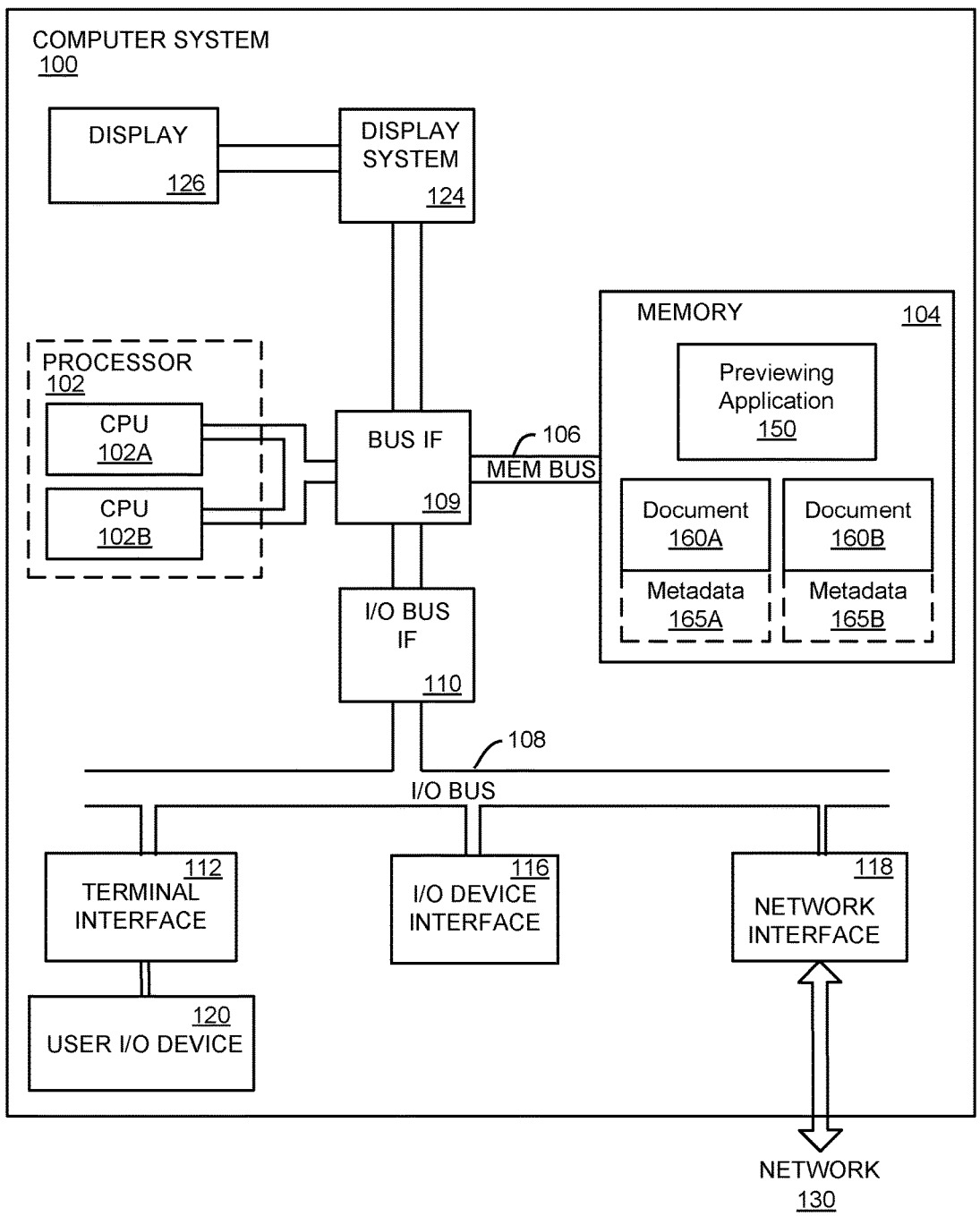
FIG. 1 is an apparatus for previewing electronic documents on a computing device, according to embodiments.

While embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to various embodiments of a system and method for previewing electronic documents on a computing device. The computing device may be displaying a section of an electronic document. While displaying the section, the device may detect a certain variety of input from the user which is directed towards an object within the section. The input may include a specific motion or gesture using a mouse or touch screen. The device may detect that the input over the object indicates a command to provide a preview of a different section of the document which is related to the object. Additionally, the specific motion or gesture may indicate the variety of preview which the user is requesting. The device may then provide this preview in such a way that the original section of the electronic document is partially visible. While the present disclosure is not necessarily limited to such applications, various aspects of the disclosure may be appreciated through a discussion of various examples using this context. Examples and example values discussed herein are provided by way of example only and are not to be construed as limiting.

In instances, computing devices may display electronic documents. Some electronic documents may be very large, with numerous sections/chapters on a variety of subjects. Some sections of the electronic document may correlate with other sections of the document. In some cases, two sections may correlate in more than one way. For example, sections may correlate because similar language is used, similar topics are discussed, or similar authors wrote the given section. In large documents, there may be more correlated material than can be displayed at a single time using predetermined font sizes. A user may view a first section of an electronic document, and may wish to see other sections of the document which correlate to the first section. The user may use an action to bring up one such related section. In some instances, the electronic document may bring up correlated sections with hyperlinks embedded in the electronic document. A user may scroll through a great number of pages/iterations of the correlated sections before the computing device display finds the sought-after material.

Aspects of the disclosure are directed towards detecting a user gesture on a word/phrase within an electronic document and then determining a specific preview the user would like to see which relates to that object. The user gesture (e.g., input gesture) may be a shape which is traced on a screen with a cursor controlled by a mouse. Alternatively, the input gesture may be a shape which is traced by a finger/stylus on a touch screen. The gesture may be over a word/phrase (e.g., object) which correlates with other sections of the electronic document. For example, the object could be "Chapter 12" within an index, and this object could correlate with a summary of the chapter and the first few paragraphs of the chapter. In response to a first gesture over Chapter 12, the device may detect that the user would like a summary preview, and may provide a summary of chapter 12 accordingly. In response to a second distinct gesture over the same Chapter 12, the device may detect that the user would like to read the first few paragraphs of the chapter, and may provide the first few paragraphs instead.

FIG. 1 depicts a high-level block diagram of a computer system 100 for previewing electronic documents. The components of the various embodiments disclosed herein apply equally to any appropriate computing system. The components of the example computer system 100 shown in FIG. 1 include one or more processors 102, a memory 104, a terminal interface 112, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In some embodiments, the computer system 100 may contain multiple processors; however, in certain embodiments, the computer system 100 may alternatively be a single CPU system. Each processor 102 executes instructions—such as the instructions from previewing application 150 to perform the acts described with respect to method 200—stored in the memory 104.

In some embodiments, the memory 104 may include a random-access semiconductor memory, storage device, or storage medium (either volatile or non-volatile) for storing or encoding data and programs. The memory 104 can include stored data such as one or more electronic documents 160A and 160B as described herein. In certain embodiments, the memory 104 may also include metadata 165A and 165B related to electronic documents as described herein. In some embodiments the metadata 165 may be stored in or alongside data of the electronic documents 160 within the memory 104 (e.g., the metadata being included in a .pdf or .doc file of the electronic document 160). In certain embodiments, the memory 104 represents the entire virtual memory of the computer system 100, and may also include the virtual memory of other computer systems coupled to the computer system 100 or connected via a network. In such embodiments, electronic documents 160 and metadata 165 may be stored in other computer systems of the network 130, and the previewing application 150 may access the documents 160 and metadata 165 through the network interface 118.

The memory 104 may store all or a portion of the various programs, modules and data structures for processing data transfers as discussed herein. For instance, the memory 104 can include the previewing application 150. In this illustrative embodiment, the previewing application 150 includes instructions or statements that execute on the processor 102 or instructions or statements that are interpreted by instructions or statements that execute on the processor 102 to carry out functions (e.g., the acts of method 200) as further described below. However, in other embodiments, the previewing application 150 is implemented in hardware via semiconductor devices, chips, logical gates, circuits, circuit cards, and/or other physical hardware devices (e.g., ASIC or FPGA) in lieu of, or in addition to, a processor-based system.

In this example, the computer system 100 includes a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using an input device in order to provide input data and commands to programs such as the previewing application 150. For example, a computer system 100 which includes a user I/O device 120 of a touchpad screen (i.e., a touchscreen) may be outputting an electronic document 160A. Upon displaying the electronic document 160A, the computer system 100 may receive user input of an input gesture on the touchscreen I/O device 120. The processor 102 may follow the instructions of the previewing application 150 and read the metadata 165A on the electronic document 160A to determine new output to display on the touchscreen I/O device 120.

The I/O device interface 116 provides an interface to any of various other I/O devices or devices of other types, such as printers or fax machines. The network interface 118 provides one or more communication paths from the computer system 100 to other digital devices and computer systems.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

FIG. 1 depicts several example components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
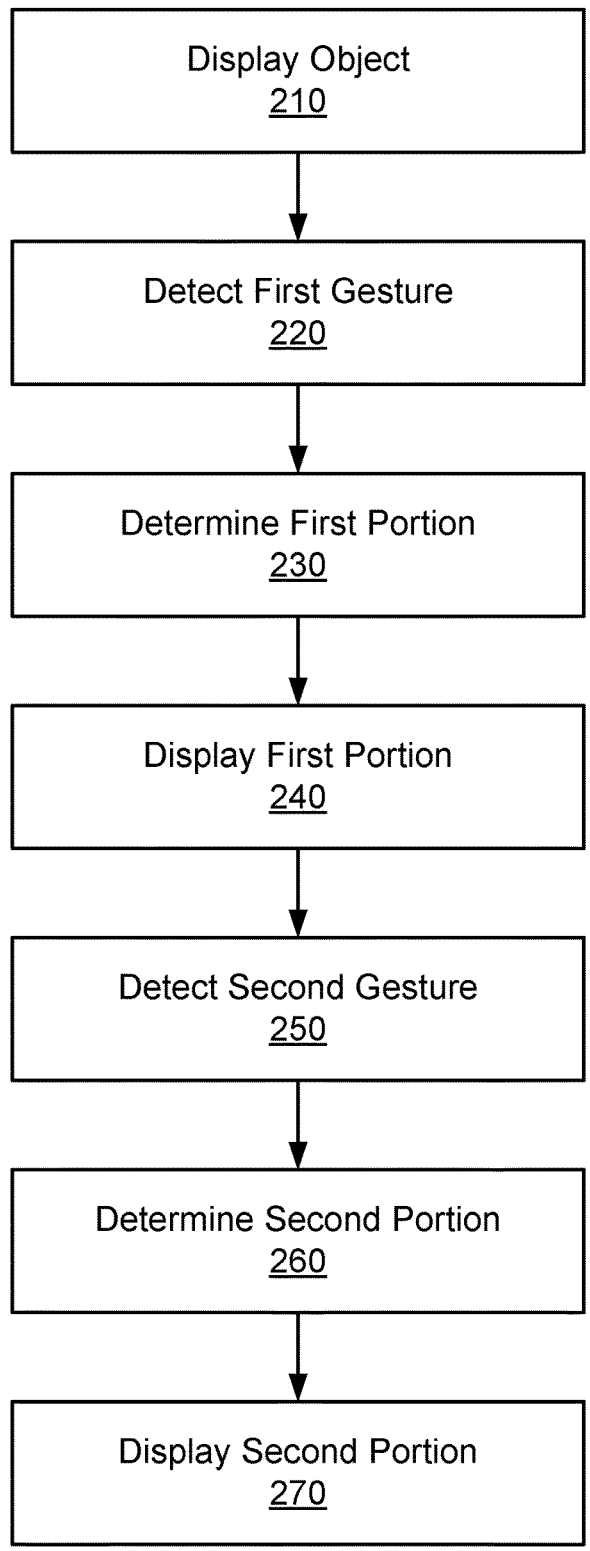
FIG. 2 is a method of previewing electronic documents on a computing device, according to embodiments.

FIG. 2 is a flowchart illustrating a method 200 for previewing electronic documents on a computing device. The computing device may be a computing system which includes a display for displaying electronic documents, such as a personal computer, tablet, or mobile phone, among other possibilities. In certain embodiments, the electronic document may be in a format which stores metadata on the contents (e.g., characters or hyperlinks) of the document. A controller of the computing device may execute method 200 on the computing device, such as the processor 102 executing previewing application 150 instructions as discussed above. The visual arrangement of blocks in the flowchart of FIG. 2 is not to be construed as limiting the order in which the individual acts/operations may be performed, as certain embodiments may perform the operations of FIG. 2 in alternative orders.

At block 210 the computing device displays an object of the electronic document. An object of the electronic document may be a collection of characters or symbols which has an association/correlation with other objects/portions of the electronic document. For example, an object may be a word, a sentence, a name, or a chapter. In some embodiments, the object has a correlation with numerous objects/portions of the electronic document.

A portion may be a selection of the electronic document which is less than the entirety of the electronic document while including other objects of the electronic document. A portion could be single sentence (e.g., a definition), a plurality of contiguous sentences, or one or more contiguous paragraphs. Alternatively, the portion may include discontiguous segments of the document (e.g., two sentences from page 25, one sentence from page 26, and a figure from page 30 which together construct an effective summary of the object).

The correlations between objects and/or portions may be stored in metadata. The metadata may be located along with data of the electronic document. For example, at block 210 the electronic document may display a table of contents which include chapter names which are objects. The electronic document may be stored in a format which can include metadata on the characters (e.g., in a .doc or .pdf format). This metadata can include information on the object "Chapter One" which includes correlations with words/characters/figures within the first chapter. In certain embodiments, the metadata can also include historical or analytical data, such as how often different portions of the electronic document are viewed.

Alternatively, the controller may use natural language processing (NLP) techniques and concept-matching techniques to determine correlations. Concept matching techniques can include, but are not limited to, semantic similarity, syntactic analysis, and ontological matching. For example, in some embodiments, NLP could be configured to parse the electronic document to determine semantic features (e.g., word meanings, repeated words, or keywords) and/or syntactic features (e.g., word structure, location of semantic features in headings, or title). Ontological matching could be used to map semantic and/or syntactic features to a particular concept. The concept can then be used to determine the subject matter of the object and other segments of the electronic document which relate to the object. Using concept matching, the controller may classify portions of the electronic document as matching the concepts of the object, therein being related.

At block 220 an input gesture is detected. The input gesture (e.g., first input gesture) may be an input from the user which indicates an object and a command related to the object. The gesture may indicate an object by being located on or substantially close to the object. The gesture may indicate a command through the specific motion of the gesture. The controller may recognize a plurality of specific motions which indicate different commands. The controller may recognize the input as being an input gesture intended to command a type of preview by an extended press/click of the input on the object.

A command could be to display a summary, a definition, a most commonly viewed section, a list of metrics, a list of commonly authored pages, or an introduction, among other possibilities. For example, if the object is "Chapter One," a gesture on the object which includes a motion from left to right may indicate a command for a summary of the chapter, while a motion from right to left may indicate a command to display the beginning of the chapter, while a circle made around the object may indicate a command to display the most viewed page(s) of the chapter. The motion may need to have a threshold magnitude to be identified as a gesture. For example, a motion from left to right may need to be at least a threshold distance (e.g., one centimeter or 40 pixels) before being identified as a motion from left to right, or a circle may need have a certain height and width (e.g., 20 pixels height and 30 pixels width) before being identified as a circle gesture.

The user gesture may be made with a cursor. Where the user gesture is made with a cursor, the user may be controlling the cursor with a mouse, and may navigate the cursor onto the document using the mouse. In some embodiments, the user gesture must be made while clicking a button of the mouse. Alternatively, the user gesture may also be made upon a touchscreen. Where the user gesture is made on a device with a touchscreen, a user may use a stylus or a finger/hand to trace over the displayed electronic document upon the touchscreen.

A controller may determine if a gesture is substantially close to the object if the gesture is within a threshold distance to the object. For example, if the computing device is a touchscreen device and the input is made through physical contact with the touchscreen, the threshold distance may be five millimeters; when a gesture is five millimeters or less from an object, the controller may determine that the gesture is within the threshold of the object and therefore that the gesture is substantially close to the object. Alternatively, if the gesture was made with a mouse, the threshold distance may instead be measured in pixels. Other embodiments of determining that gestures are substantially close to the object are also possible.

At block 230 a first portion of the document is determined. The first portion may be another segment of the electronic document. A controller may determine the first portion in response to the first portion correlating with both the object and the first input gesture. In some embodiments, the controller may cross-reference the object and the input gesture within the metadata to determine the first portion. In other embodiments, the controller may use natural language processing (NLP) techniques to determine a portion of the document which correlates with both the object and command of the input gesture.

For example, at block 220 the controller may have determined that the input gesture is over an object "Chapter One." The controller may pull up metadata on the object which includes one or more portions of the document which correlate with the object. For example, the metadata could include a summary of chapter one, the first few paragraphs of chapter one, or the most commonly viewed pages of chapter one. In some embodiments, the metadata could include some metrics or data on the object (e.g., number of graphics within the chapter, number of equations within the chapter, author(s) of the chapter, or most common proper nouns within the chapter). Different portions/metrics within the metadata on the object could be associated with different input gestures (e.g., summary of the object is associated with swipe from left to right, first three paragraphs of the object is associated with swipe from right to left, circle around object is associated with most commonly viewed pages, metrics on the object is associated with swipe from top to bottom). In this example, at block 220 the input gesture may have included a swipe from right to left. As such, the controller may cross reference the object "Chapter One" with the input gesture motion swipe from right to left to determine the first three paragraphs of chapter one as the determined first portion.

Alternatively, the controller may use NLP as described herein to identify a portion of the electronic document which correlates to both the command and object of the input gesture. For example, at block 220 the controller may detect an input gesture over the object "Chapter One" which included a motion from left to right. The controller may identify this input gesture as a command for a summary of chapter one. The controller may analyze the text of the electronic document using NLP for a collection of words which summarize the chapter. For example, the first paragraph of chapter one may have a sentence which begins "as this chapter will show," while numerous sentences within the first chapter may include the phrase "in conclusion," and the seventh chapter may include a sentence which states "as the first chapter demonstrated," each of which may be identified as summarizing some amount of the object (e.g., chapter one). The controller may combine some or all of these fragments of the document into a single portion which is therein determined as the first portion at block 230.

At block 240 the determined first portion of the electronic document is displayed. The controller may display the first portion of the document in a way such that the object is still at least partially visible. In some embodiments, the first portion of the document may be displayed transparently, such that text/characters which are "behind" the first portion are still visible. In other embodiments, the text/characters which were displayed when the input gesture was detected may be "shrunk." The text/characters may be shrunk to an area outside of where the first portion was displayed. In other embodiments, the original text/characters may be concealed where the first portion is displayed. In embodiments where the device includes a touchscreen which is used for the input gesture, the controller may display the first portion in a section of the screen which is unobscured by the physical item (e.g., stylus or hand of user) used to deliver the input gesture.

Figure 3:
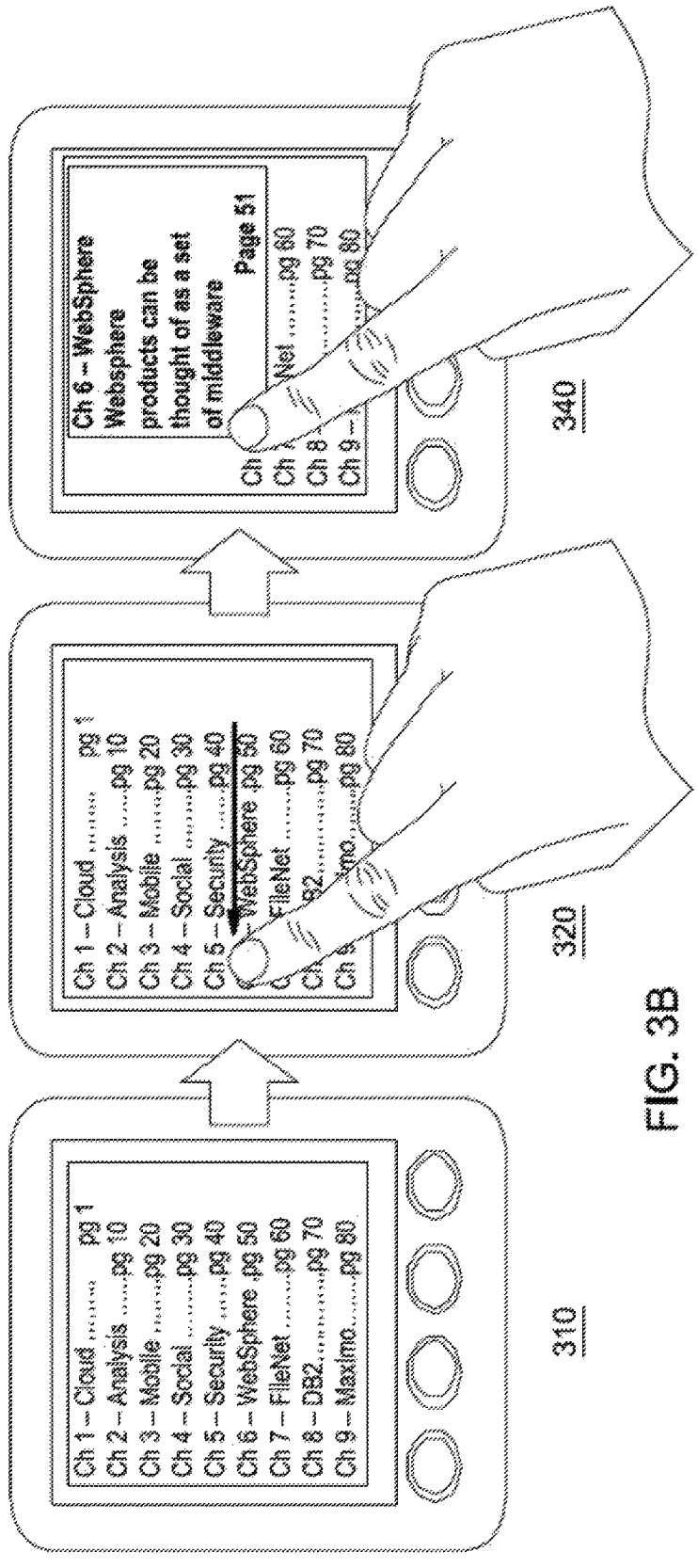
FIG. 3A is an illustration of content of an electronic document, according to embodiments.
FIG. 3B is an illustration of an electronic document being previewed on a computing device, according to embodiments.

For example, FIG. 3A shows some portions of an electronic document, such as a table of contents, the beginning of chapter one, and the beginning of chapter six. FIG. 3B shows the process of displaying an object and a portion of the document. The device at 310 is a touchscreen device which is displaying an object of "Ch 6-WebSphere" among other objects (e.g., the other chapters) in a manner consistent with block 210 from FIG. 2. A controller at 320 may detect an input gesture in a manner consistent with block 220 from FIG. 2. The controller may detect the input gesture as being a swipe of a finger from right to left across the object, as shown in 320.

The controller may determine the input gesture to indicate a command to display a summary of the object. In response to this command, at 340 the controller displays a summary of the object in a manner consistent with block 240 from FIG. 2. The controller may display the summary portion in a semi-transparent way, in order to allow the user to still see any characters/text in which the portion was requested. The controller may also shift/shrink/conceal what was originally displayed to not overlap with the displayed portion. For example, if the portion is displayed on the top half of the screen, the "original" screen (e.g., the objects which were displayed at the time of the user input) may be shrunk to fit in the bottom half of the screen.

The controller may also determine that, given the width/pressure/history/settings of the user, the input gesture was made with the finger of a right handed-user. Using this information, the controller may determine that, for example, the bottom two inches of the screen are blocked, as is the centimeter immediately to the right of the current placement of the user finger, but the area to the left of the user finger and the area to the right of the centimeter and above the two inches is unblocked. Upon determining the blocked section, the controller may display the summary portion of the electronic document in a section of the screen which does not overlap with the blocked section.

In some embodiments with a touch screen device, the controller may display the portion until the physical item which was used to provide the input gesture is removed from the touch screen (e.g., once the controller detects a cessation of pressure upon the object). Put differently, on a touch screen a user may place a hand/stylus on the screen and make an input gesture on an object on the screen while leaving said hand/stylus upon the screen. In response to this, the controller may display the corresponding portion of the document until the user hand/stylus is lifted from the screen, at which point the corresponding portion will be closed, reverting back to the original document view. In other embodiments, the controller may display the portion in response to the user gesture and close the portion in response to a different user input (e.g., pressing an "X" associated with the portion or pressing a physical button of the computing device).

In some embodiments the controller may determine that only a subset of the portion may be displayed at a single time. For example, a determined first portion may include three paragraphs of the document, and the controller may determine that the available unblocked screen of the device may only allow a subset of the first portion at the predetermined text size. In these embodiments, the controller may allow scrolling through the portion, such that the window with the previewed portion does not move upon the screen. Alternatively, in these embodiments the controller may only display a single element (e.g., sentence, paragraph, page, or chapter) at a time, allowing the users to "click" to the next element. In certain embodiments, a user may be able to change how the controller displays the subset of text within a preview configuration menu, as discussed below, for example, with respect to FIG. 4.

A user may continue scrolling/moving through the portion through a continuation of the input gesture. For example, if the input gesture was a clockwise circle, the controller could determination after a single gestured circle what the desired portion was. Following the determination of the desired portion, the controller may scroll down through the displayed portion with continued clockwise circles, while scrolling up with counterclockwise circles. Alternatively, if the input gesture is a swipe from right to left, a controller may determine the desired portion after an inch-long swipe, after which a continued swipe may scroll down through the displayed portion. Other embodiments of the controller determining a continuation of the input gesture to be a scrolling command are also possible.

In certain embodiments, a user may have the ability to enlarge the displayed portion of the document, such as making the displayed portion "full screen" on the display of the computing device. For example, the document may be a U.S. history book, and the user may circle the word "Theodore Roosevelt" to bring up other instances of the name within the document. The document may have a large number of instances of the name Theodore Roosevelt, perhaps enough to constitute numerous pages. To ease the reading of the compilation of the instances of the selected object, the controller may detect the user providing an input to enlarge the displayed portion, and in response display the portion in a relatively larger section of the screen.

In some embodiments, a controller may determine that a portion which is sought by the user is not found. For example, at block 210 of FIG. 2 the device may display a technical term, and at block 220 the controller may detect an input gesture upon the technical term which indicates a command of a definition of the term. The metadata on the technical term may not include a definition, and/or the controller may determine that an NLP analysis of the document did not identify a definition. In response to this, the controller at 240 may display a message that informs the user that the requested portion could not be found.

At block 250 a second input gesture is detected. The second input gesture may be detected as described herein. The second gesture may be on or substantially on the same object as the first input gesture. The second input gesture may include a different motion than the input gesture from block 220 (e.g., a swipe from left to right versus a swipe from right to left). The second input gesture may indicate a command for the object which is different than the command indicated by the first input gesture (e.g., a command to bring up the most commonly viewed page versus a command to bring up a summary).

At block 260 a second portion is determined. The second portion may be determined substantially similar to how the first portion was determined in block 230. The second portion may correlate with the object and the second input gesture. The second portion of the electronic document may be different than the first portion of the electronic document.

At block 270 the second portion is displayed. The second portion may be displayed in substantially the same way as the first portion was displayed in block 240. The second portion may be displayed in response to detecting the second input gesture over the object. In this way the controller may display numerous varieties of related content in response to simple inputs, allowing quick comprehension of large documents.

Figure 4:
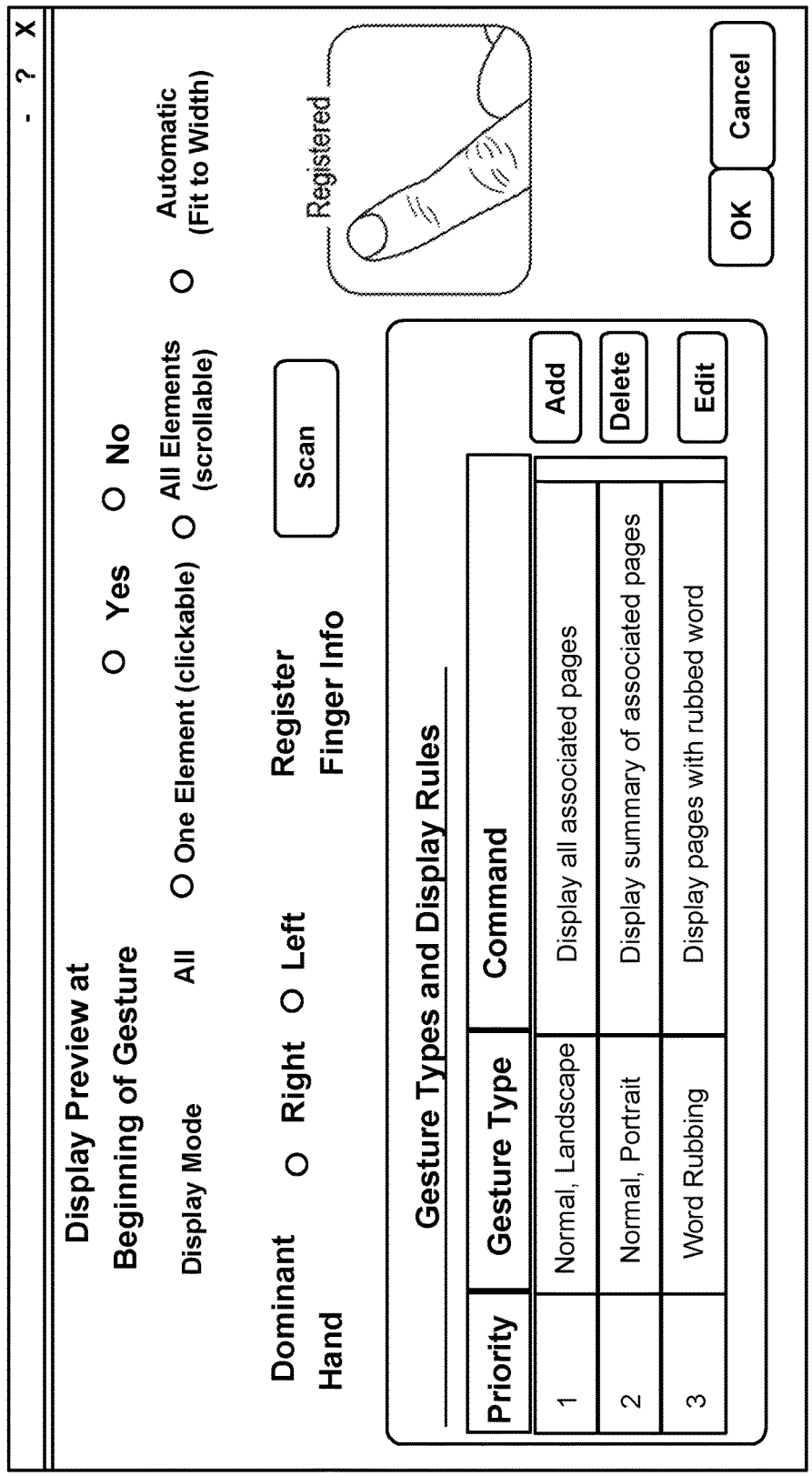
FIG. 4 is an illustration of a preview configuration menu, according to embodiments.

In some embodiments, a user may change certain settings used by the controller. FIG. 4 depicts a menu the user could use to change these settings. For example, a user could change the commands associated with an input gesture. A controller may recognize a predetermined set of gestures (e.g., a line from right to left, from top to bottom, rubbing a word, or circling a word) and a predetermined set of commands (e.g., display a summary, display all pages, or display most common pages). Within a settings page, a user may change the associations between gestures and commands. Associations may be changed by switching which gesture a command is associated with, therein potentially not using some available gestures of commands. In some embodiments, a user may specify that certain gestures have higher priorities than other gestures, such that if a gesture is detected but not identified (e.g., the controller detects an input which meets the threshold for more than one gesture), the gesture with the higher priority is used.

A settings page may intake user information regarding how to display the portion. For example, the settings page may intake the dominant hand of the user, which the controller may use to determine a blocked section of a touch screen as described herein. The settings page may register a fingerprint of one or more users. By registering fingerprint data, the controller may quickly switch between two different sets of settings associated with different fingerprint data. The user may also provide information which the controller may use to determine portions of the document to preview, such as preferred words which the controller should prioritize when determining and/or displaying a portion. For example, a user may input the words "Theodore" and "Teddy" as preferred words to expedite researching Theodore Roosevelt. If the controller identifies five paragraphs which correlate with the input gesture, two of which include preferred words, the two paragraphs with the preferred words may be displayed first.

The functionality outlined in the discussions herein regarding FIG. 2, FIG. 3A, FIG. 3B, and FIG. 4 above can be implemented using program instructions executed by a processing unit, as described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of previewing electronic documents on a computing device, the method comprising:

displaying a page within an electronic document, the page having a plurality of objects, wherein a first object of the plurality of objects correlates with both a first portion of the electronic document and a second portion of the electronic document, wherein the first portion and the second portion are different, wherein the first portion of the electronic document and the second portion of the electronic document each have a correlation with a respective input gesture;

detecting a first input gesture located within a predetermined distance of the first object;

determining that the first portion of the electronic document correlates with both the first object and the first input gesture;

displaying the first portion of the electronic document in response to detecting the first input gesture within the predetermined distance of the first object;

detecting a second input gesture located within the predetermined distance of the first object, wherein the second input gesture is distinct from the first input gesture and includes a different motion than the first input gesture;

determining that the second portion of the electronic document correlates with both the first object and the second input gesture, wherein the first portion includes at least one first element from the electronic document not included in the second portion and the second portion includes at least one second element from the electronic document not included in the first portion; and displaying the second portion of the electronic document in response to detecting the second input gesture within the predetermined distance of the first object.

2. The method of claim 1, wherein correlations of the first object are stored in metadata.

3. The method of claim 1, wherein correlations of the first object are determined using natural language processing techniques.

4. The method of claim 1, wherein the first object correlates with a third portion of the electronic document, the method further comprising:

detecting a third input gesture located within the predetermined distance of the first object, wherein the third input gesture includes a different motion than either the first input gesture or the second input gesture;

determining that the third portion of the electronic document correlates with both the first object and the third input gesture;

displaying a first subset of the third portion of the electronic document in response to detecting the third input gesture within the predetermined distance of the first object, wherein the first subset is less than the third portion;

detecting a continuation of the third input gesture; and scrolling to a second subset of the third portion in response to detecting the continuation of the third input gesture, wherein the second subset is different than the first subset and less than the third portion.

5. The method of claim 1, wherein detecting the first input gesture comprises detecting a physical object placed upon a touch screen of the computing device, the method further comprising:

determining a blocked section of the touch screen which is obscured by the physical object; and displaying the first portion in a section of the touch screen which does not overlap with the blocked section.

6. The method of claim 1, wherein detecting the first input gesture and the second input gesture each comprises detecting a physical object placed upon a touch screen of the computing device within the predetermined distance of the first object; and in response to detecting that the physical object is no longer placed upon the touch screen within the predetermined distance of the first object while displaying the first portion, closing the displayed first portion; and in response to detecting that the physical object is no longer placed upon the touch screen within the predetermined distance of the first object while displaying the second portion, closing the displayed second portion.

7. The method of claim 1, wherein displaying the first portion includes displaying the first portion such that some of the first object is still visible.

8. The method of claim 7, wherein the displayed first portion is at least partially transparent.

* * * * *